Feb. 23, 1943. G. K. NEWELL 2,311,856
INERTIA OPERATED CONTROL DEVICE
Filed Sept. 25, 1941
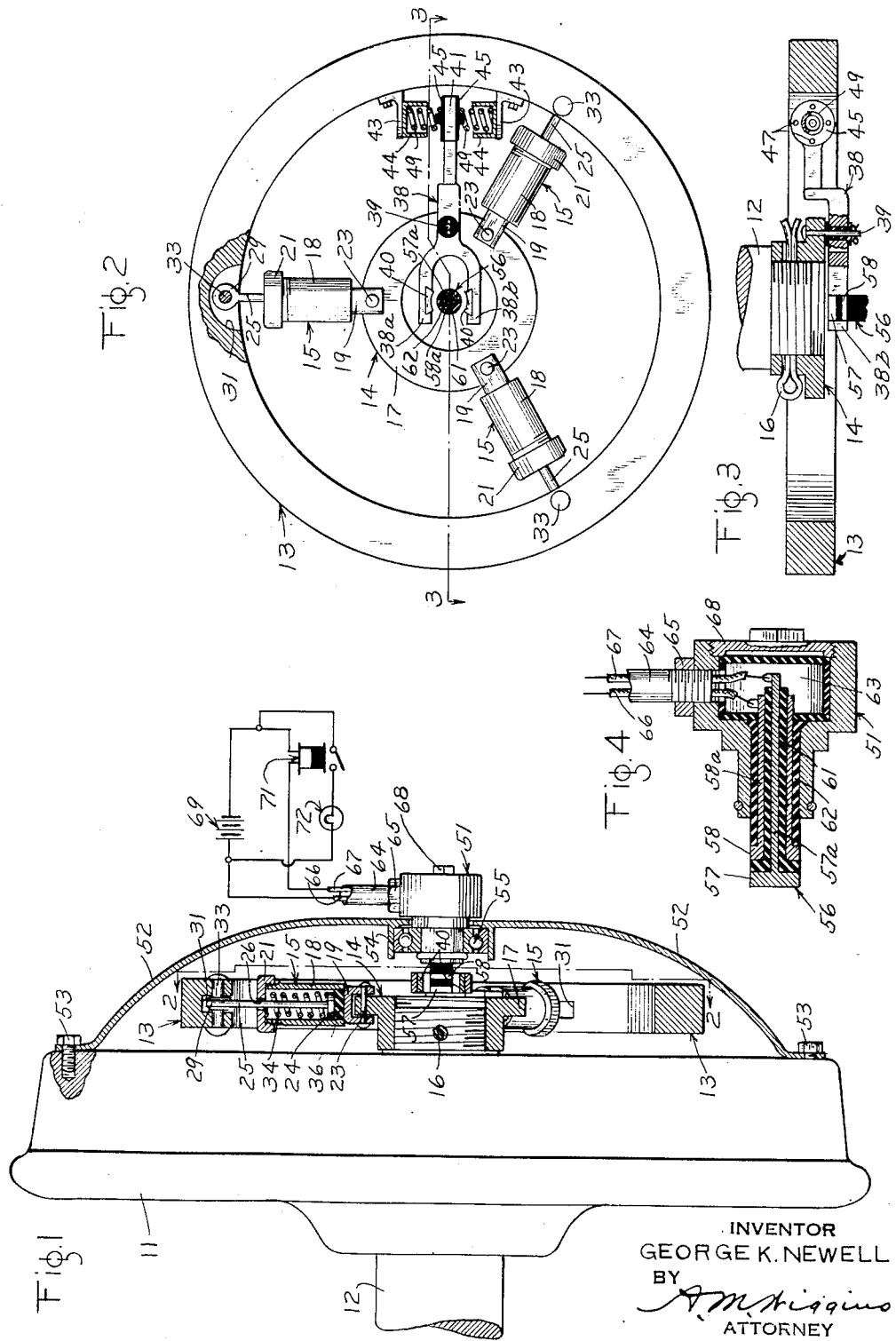
INVENTOR
GEORGE K. NEWELL
BY
A. M. Higgins
ATTORNEY Patented Feb. 23, 1943

2,311,856

UNITED STATES PATENT OFFICE 2,311,856

INERTIA OPERATED CONTROL DEVICE

George K. Newell, near Pitcairn, Pa., assignor to The Westinghouse Air Brake Company, Wilmerding, Pa., a corporation of Pennsylvania Application September 25, 1941, Serial No. 412,292

13 Claims. (Cl. 200—52)

This invention relates to inertia operated control devices and has particular relation to inertia operated devices of the rotary type adapted to register the rate of change of speed of a rotary element for a desired purpose.

Rotary inertia devices heretofore known comprise essentially an inertia ring rotatably supported through bearings on a rotary shaft or spindle and adapted to be driven through a resilient connection, such as a spring either of the coil or leaf type, whereby to permit the inertia ring to shift rotatively ahead of or behind a predetermined relative position with respect to the driving spindle upon deceleration and acceleration of the spindle respectively, the degree of displacement in either the forward or backward direction corresponding substantially to the rate of deceleration or the rate of acceleration of the spindle respectively.

A rotary inertia controller of this type is disclosed in Patent No. 2,198,033 to Clyde C. Farmer and is employed in connection with a fluid pressure brake control system for the purpose of automatically reducing the degree of application of the brakes associated with a car wheel, when the car wheel begins to slip, so as to prevent the sliding thereof.

It has been found, however, that in rotary inertia controllers of the type shown in the said Farmer patent, the shock and vibration caused by operation of the car wheels produces a fretting or corrosion of the parts of the bearing supporting the inertia ring on the spindle resulting eventually in non-uniform or inaccurate response to acceleration and deceleration of the car wheel.

It is accordingly an object of my invention to provide a rotary inertia controller particularly adapted for service in connection with the wheels of a railway car for a desired purpose such as the automatic control of the brakes, which device eliminates the need for bearings supporting the inertia ring of the device and thereby obviates the undesirable fretting or corrosion of bearing parts.

It is another object of my invention to provide a rotary inertia device wherein the inertia ring is supported in coaxial relation on the driving shaft through radially extending members including resilient elements normally holding the ring in a predetermined rotative position with respect to the shaft and adapted to yield to permit rotative movement of the inertia ring relative to the shaft upon deceleration and acceleration of the shaft.

The above objects, and other objects of my invention which will be made apparent hereinafter, are attained by means of an illustrative embodiment of my invention subsequently to be described and shown in the accompanying drawing, wherein, Fig. 1 is a vertical sectional view of my rotary inertia device shown illustratively as applied to the end of an axle for a car wheel, Fig. 2 is a view, taken substantially along the line 2—2 of Fig. 1, showing further details of construction.

Fig. 3 is a horizontal sectional view, taken substantially on the line 3—3 of Fig. 2, also showing further details of construction, and Fig. 4 is an enlarged view in vertical section, showing details of the contact spindle shown in outline form in Fig. 1.

Description of equipment

Referring to Fig. 1, the rotary inertia device comprising my present invention is illustratively shown in connection with a car wheel 11 for the purpose of registering the rate of deceleration or acceleration thereof. The car wheel 11 is fixed on the end of an axle 12 which is journaled to the truck frame inboard of the wheel in well known manner.

The rotary inertia device comprising my present invention includes an inertia ring 13 of suitable mass and diameter, a screw collar 14 screwed on the threaded outer end of the axle 12, and three radially arranged extendible members 15 connecting the inertia ring 13 to the screw collar 14.

As will be seen in Figs. 1 and 3, the screw collar 14 is locked on the axle 12 by suitable means, such as the cotter pin 16 that extends through a hole bored in the collar 14 and axle 12, and is provided with a radially extending flange 17 at the outer end thereof.

The extendible members 15 for supporting the inertia ring 13 are identical in construction, each being made up of a tubular element 18, a U-shaped bracket 19 suitably secured, as by welding, to one end thereof and a screw cap secured on the opposite threaded end thereof. The U-shaped bracket 19 of each member 15 straddles the annular flange 17 on the screw collar 14 and is pivotally connected thereto as by a pin or rivet 23.

Contained within the smooth inner bore of the tubular element 18 is a plunger or piston 24 having a stem 25 screwed therein that extends through and moves slidably in a circular opening 26 in the screw cap 21. The outer end of the stem 25 is provided with an eyelet 29 which extends into a semi-circular slot 31 on the inner surface of the inertia ring 13 and is pivotally secured to the ring, as by a pin or rivet 33 extending transversely through the ring and the opening in the eyelet 29.

Also contained within the tubular element 18 in surrounding relation to the stem 25 is a coil spring 34 which is interposed between the screw cap 21 and plunger 24. The spring 34 is of such length and is so designed that it is under compression normally and serves to yieldingly bias the plunger to the inner end of the tubular element where it engages a suitable plug or stop 36 of resilient material such as rubber.

It will thus be apparent that the inertia ring 13 is supported for rotation with the axle 12 in a fixed plane as well as in a certain normal position relative to the axle as long as the axle rotates at a constant speed. It will also be seen that upon the rotational deceleration or acceleration of the axle and connected wheel 11 at a sufficient rate, the inertia force of the ring 13 is effective to overcome the force of the springs 34, which yield to permit outward movement of the stems 25 and the consequent limited rotational movement of the inertia ring relative to the axle 12, the degree of displacement of the inertia ring either in a leading or a lagging direction being substantially proportional to the rate of change of rotational speed of the axle.

In order to utilize the rotational movement of the inertia ring 13 with respect to the axle 12 for a desired purpose, a contact or switch mechanism is provided which operates in response thereto. This switch mechanism comprises a forked contact member 38 of suitable metal such as steel, pivotally mounted in electrically insulated relation to the screw collar 14, as by a pin 39 that extends through the annular flange 17. The forked member 38 is provided with two arms 38a and 38b that extend radially inward and are respectively positioned above and below the axis of the axle 12, each arm having a contact element 40 of suitable material such as graphite secured therein.

The end of the forked member 38 opposite the arms 38a and 38b extends into the plane of rotation of the inertia ring 31 and terminates in a circular disk 41 adjacent the inner surface of the inertia ring. The inertia ring has two brackets 43 respectively secured thereto on opposite sides of the disk 41, each bracket 43 having a small circular cup member 44 attached thereto as by spot welding. The opposite faces of the circular disk 41 are covered by suitable circular disks 45 of insulating material secured to the disk 41 as by a plurality of rivets 47. Interposed between each bracket 43 and the corresponding face of the disk 41 on the forked member 38 is a coil spring 49 which is received in and closely confined in the cup member 44 attached to the bracket.

The contact or switch mechanism further comprises a contact spindle device 51 which is supported in coaxial relation outboard of the outer end of the axle 12 by means of a shallow dish-shaped support 52 secured at a plurality of points around the periphery thereof, as by a plurality of screws 53, to the side surface of the wheel 11.

As will be seen in Fig. 1, the support 52 has a hub 54 in which the spindle device 51 is journalled as by a roller bearing 55 so that the spindle device may be held in a non-rotative position while the wheel rotates.

Referring to Fig. 4, the spindle device 51 comprises a spindle 56 that extends between the arms 38a and 38b of the forked member 38 and has two collector rings 57 and 58 at the outer end thereof adapted to be bridged by the contact elements 40 in the arms 38a and 38b when the forked member is suitably rocked.

The spindle 56 is formed as shown in Fig. 4 by a series of concentrically arranged conducting and insulating tubes or rods. Thus collector ring 57 is provided with a centrally disposed rod or stem 57a whereas the collector ring 58 is formed at one end of a tubular element or sleeve 58a of conducting material such as brass or an alloy thereof. Interposed between the sleeve 58a and the rod 57a is a sleeve 61 of insulating material and interposed between the sleeve 58a and the receiving bore in the casing is an insulating sleeve 62.

The casing of the spindle device 51 is provided with a suitable chamber 63 into which the rod 57a and the sleeve 58a extend. An armored cable 64 having threads at the ends thereof is screwed into a correspondingly threaded bore in the casing and secured thereto, as by a nut 65, and electrical wires 66 and 67 contained within the cable are connected to the sleeve 58a and the rod 57a respectively as by soldering to clips formed on or attached thereto.

In order to facilitate the assembly of the spindle device as well as the connection of the wires 66 and 67 to the sleeve 58a and rod 57a, a removable screw plug 68 is provided in a threaded opening at one side of the chamber 63.

The wires 66 and 67 may form a part of any desired circuit. For illustrative purposes I have shown a simple circuit including a battery 69 and a relay 71 of the slow-release type effective when picked-up to cause the supply of current from the battery 69 to a suitable indicating lamp 72.

In operation, when the inertia ring 13 tends to over-run the axle 12 and accordingly assumes a leading position with respect to the axle, the forked contact member 38 is rotated on the pivot pin 39 so as to cause engagement of one of the contact elements 40 with both of the collector rings 57 and 58 on the spindle 56, thereby completing the circuit for causing energization on the winding of the relay 71.

The coil springs 49 are so designed that they do not yield until after the contact element 40 engages the collector rings 57 and 58, thus yieldingly cushioning the engagement of the contact elements 40 and the spindle element 56.

Upon acceleration of the wheel and axle, when the inertia ring 13 tends to assume a lagging position with respect thereto, forked contact member 38 is shifted in the opposite direction on the pin 39 to cause the other contact element 40 to engage and bridge the collector rings 57 and 58.

It will be apparent that the forked member 38 must be electrically insulated from the axle 12 as well as the inertia ring 13 in order to prevent grounding of the electrical circuit controlled by the switch mechanism. The forked member 38 is accordingly insulated from the ring 13 by the insulating disks 45 and from the axle by suitable insulation around the pin 39.

When employed in a brake control equipment for railway cars, the rotary inertia device comprising my invention may be so constructed and arranged as to register only a slipping rate of deceleration or acceleration of the car wheel 11. In view of the fact that a car wheel does not decelerate normally at a rotational rate exceeding a rate of deceleration of the car of 5 or 6 miles per hour per second, it is possible to so design and adjust the coil springs 34 that the contact elements 40 on the forked member 38 are not actuated into contact bridging relation with the collector rings 57 and 58 unless the rate of deceleration or acceleration of the car wheel exceeds a rate corresponding to ten miles per hour per second deceleration of the car. In such case, the closure of the circuit is positive indication that the wheel is slipping, that is, rotating at a speed less than a speed corresponding to car speed at a given instant. The term "wheel slipping" as employed herein is not synonymous with "wheel sliding," the term "sliding" referring solely to the dragging of a car wheel along a road surface or rail in a locked or non-rotative condition.

Although I have illustrated only a simple circuit for controlling indicating lamp 72, it will be apparent that the switch mechanism of the rotary inertia device may be employed for initiating the rapid reduction of brake cylinder pressure to cause a rapid release of the brakes whenever a car wheel begins to slip.

Whether the rotary inertia device is employed merely to control an indicating lamp or whether it is employed to effect a reduction in the degree of application of the brakes associated with the slipping wheel, it may be desirable to cause a continued illumination of the indicating lamp or a continued reduction in the degree of application of the brakes until the car wheel is restored substantially to car speed. The relay 71 is accordingly indicated as of the slow-release or slow drop-out type so that during the interval in which the slipping wheel changes from deceleration to acceleration, the momentary separation of the contact element 40 from bridging contact with the collector rings 57 and 58 will not cause drop-out of the relay 71.

It will be understood that while I have shown my rotary inertia device as applied to a railway car wheel, the device is applicable to any rotary element or shaft.

The present invention is similar in its broad aspects to the rotary inertia devices disclosed and claimed in my copending applications Serial No. 330,805 and 429,384, filed April 20, 1940, and February 3, 1942, respectively, as well as in the copending prior application Serial No. 376,728, Patent 2,290,589, July 21, 1942 of Adelbert A. Steinmiller, filed January 31, 1941, all of which applications are assigned to the assignee of this application.

Having now described my invention, what I claim as new and desire to secure by Letters Patent, is:

1. A device for detecting the rate of change of speed of a rotary element, said device comprising an inertia ring, a plurality of radially arranged elements effective to support said ring in concentric relation and in a certain rotative position with respect to the rotary element as long as the rotary element rotates at a constant speed and resiliently extendible to permit rotary movement of the said ring relative to the said rotary element upon a change in speed of the rotary element, and means operated in response to the rotary movement of the said ring relative to the rotary element.

2. A device for registering the rate of change of speed of a rotary element, said device comprising a member rotatable according to the rotational speed of the rotary element, an inertia ring, a plurality of elements connected to the rotatable member in spaced peripheral relation, a plurality of elements connected to said ring in spaced peripheral relation and adapted to register radially with corresponding ones of said elements connected to said rotatable member, and coil spring means interposed between each two cooperating elements for causing said ring to be supported in concentric relation to the rotatable member and maintaining said ring in a certain rotative position relative to the rotatable member as long as the speed of the rotatable member does not change and effective to yieldingly permit rotary movement of the ring relative to the rotatable member upon a change in speed of the rotatable member, and means operated in response to the rotary movement of the said ring relative to the rotatable member.

3. A device for detecting the rate of change of speed of a rotary element, said device comprising a member rotatable according to the rotational speed of the rotary element, an inertia ring, a plurality of extendible members arranged radially and pivotally connected at opposite ends to the rotatable member and said ring for supporting said ring in concentric relation to said rotatable member, each of said extendible members including a coil spring, said springs being effective under compression to maintain said ring in a given rotative position relative to the rotatable member as long as the rotatable member rotates at a constant speed and adapted to be yieldingly compressed to permit the rotary movement of the said ring relative to the rotatable member upon a change in speed of the rotatable member, and means operative in response to rotary movement of the said ring relative to the rotatable member.

4. A device for detecting the rate of change of speed of a rotary element, said device comprising a member rotatable accordingly to the rotational speed of the rotary element, an inertia ring, a plurality of radially arranged tubular members pivotally connected to said rotatable member at spaced peripheral points thereof, a plurality of plunger elements each one of which is slidable within a corresponding one of said tubular elements and pivotally connected to said ring, a plurality of coil springs each one of which is contained within a corresponding one of said tubular elements and under compression so as to urge said tubular element and said plungers radially in opposite directions whereby to cause said inertia ring to be supported in concentric relation and in a given rotative position relative to the said rotatable member as long as the rotational speed of the rotatable member does not change and adapted to be yieldingly compressed to permit rotary movement of the said ring relative to the rotatable member upon a change of speed of the rotatable member, and means operative in response to the rotative movement of said ring relative to said rotatable member.

5. A device for detecting the rate of change of speed of a rotary element, said device comprising a member rotatable according to the rotational speed of the rotary element, an inertia ring supported in concentric relation to the rotatable member, resilient means maintaining said ring in a given rotative position relative to the rotatable member as long as the rotatable member rotates at a constant speed and adapted to yieldingly permit rotative movement of the inertia ring relative to the rotatable member upon a change in speed of the rotatable member, a contact member pivoted on said rotatable member and cooperating with said ring in such a manner as to be pivoted out of a normal position in response to the rotative movement of the inertia ring out of its normal position with respect to the rotatable member, and a pair of non-rotative insulated collector rings so located as to be bridged by said contact member when pivotally shifted out of its normal position.

6. A device for detecting the rate of change of speed of a rotary element, said device comprising a member rotatable according to the rotational speed of the rotary element, an inertia ring supported in concentric relation to the rotatable member, resilient means effective to maintain said ring in a given rotative position with respect to the rotatable member as long as the rotatable member rotates at a constant speed and effective to yieldingly permit displacement of the inertia ring forwardly or backwardly of its normal position substantially in accordance with the rate of deceleration and acceleration of the rotary element respectively, a forked contact member pivotally carried on said rotatable member and cooperating with said inertia ring in such a manner as to be rocked in opposite directions with respect to a given position upon the rotary displacement of the inertia ring in opposite directions with respect to its given normal position relative to the rotatable member, and a pair of non-rotative collector rings so located as to be engaged in bridging relation by said forked contact member upon pivotal movement thereof in either direction out of its normal position.

7. A device for detecting the rate of deceleration and the rate of acceleration of a vehicle wheel comprising a member secured to said wheel and rotatable therewith, an inertia ring, means supporting said ring in concentric relation to the rotatable member and providing a yielding driving connection therebetween whereby said ring is maintained in a given rotative position relative to the rotatable member as long as the rotatable member rotates at a constant speed and whereby said ring may shift rotatively either forwardly or backwardly with respect to its normal rotative position relative to the rotatable member upon deceleration and acceleration of the rotatable member, a contact arm pivotally carried on said rotatable member and cooperating with said ring in such a manner as to be pivotally moved out of a normal position upon the rotary displacement of the inertia ring out of its given rotative position relative to the rotatable member, a support fixed to and rotatable with said wheel, said support having a hub in coaxial alignment with said rotatable member, and a spindle device journaled in said hub and held against rotation, said spindle device comprising a pair of insulated collector rings adapted to be engaged in bridging contact by the pivoted contact member upon displacement out of its normal position.

8. A rotary inertia device comprising a rotatable member, an inertia ring, and a plurality of radially arranged extendible members pivotally connected at opposite ends to said rotatable member and said ring for supporting said ring in concentric relation to said rotatable member and effective to maintain said ring in a certain normal position rotatively with respect to said rotatable member as long as the rotatable member rotates at a constant speed and adapted to be extended to permit limited rotative movement of the inertia ring relative to the rotative member forwardly or backwardly of the given normal condition upon deceleration and acceleration respectively of the rotatable member.

9. A rotary inertia device comprising a rotatable member, an inertia ring, a plurality of tubular members arranged in radial relation and pivotally connected at spaced peripheral points to said rotatable member, a plurality of plunger-like elements each of which is slidable within a corresponding one of said tubular elements and connected at the outer end thereof pivotally to said inertia ring, a plurality of coil springs of the compression type one contained in each of said tubular elements in interposed relation between the tubular element and the corresponding plunger whereby to cause said ring to be supported in concentric relation to the rotatable member and in a given rotative position with respect to the rotatable member as long as the rotatable member rotates at a constant speed and adapted to be yieldingly compressed to permit a limited rotative movement of the inertia ring forwardly or backwardly of its given rotative position upon deceleration and acceleration of the rotatable member respectively.

10. A rotary inertia device comprising a rotary element, an inertia ring, and a plurality of radially arranged elements supporting said ring in concentric relation and in a certain rotative position with respect to the rotary element as long as the rotary element rotates at a constant speed and resiliently extendible to permit the rotary movement of said ring relative to the rotary element upon a change in rotational speed of the rotary element.

11. A device for detecting the rate of change of speed of a rotary element, said device comprising a member rotatable according to the rotational speed of the rotary element, an inertia ring, a plurality of radially arranged elements effective to support said ring in concentric relation and in a certain rotative position with respect to the rotatable member as long as the rotary element rotates at a constant speed and resiliently extendible to permit the rotary movement of the said ring relative to the said rotatable member upon a change in speed of the rotary element, a contact member pivoted on said rotatable member and cooperating with said ring in such a manner as to be pivoted out of a certain normal position in response to the rotative movement of said ring out of its said certain position with respect to the said rotatable member, and a pair of non-rotative insulated collector rings so located as to be bridged by said contact member when pivotally shifted out of its normal position.

12. A device for detecting the rate of change of speed of a rotary element, said device comprising a member rotatable according to the rotational speed of the rotary element, an inertia ring, a plurality of radially arranged elements effective to support said ring in concentric relation and in a certain rotative position with respect to the rotatable member as long as the rotary element rotates at a constant speed and resiliently extendible to permit the rotary movement of the said ring relative to the said rotatable member upon a change in speed of the rotary element, a contact member pivoted on said rotatable member and cooperating with said ring in such a manner as to be pivoted out of a certain normal position in response to the rotative movement of said ring out of its said certain position with respect to the said rotatable member, and a pair of non-rotative insulated collector rings located in coaxial relation to said rotatable member so as to be bridged by said contact member as long as the contact member is pivotally shifted at least a predetermined amount out of its normal position.

13. A device for detecting the rate of change of speed of a rotary element, said device comprising a member rotatable according to the rotational speed of the rotary element, an inertia ring, a plurality of radially arranged elements effective to support said ring in concentric relation and in a certain rotative position with respect to the rotatable member as long as the rotary element rotates at a constant speed and resiliently extendible to permit the rotary movement of said ring relative to said rotatable member upon a change in speed of the rotary element, a forked contact member pivotally carried on said rotatable member and cooperating with said inertia ring in such a manner as to be pivotally rocked in opposite directions with respect to a certain position upon the rotary displacement of the inertia ring in opposite directions out of its said certain rotative position with respect to said rotatable member, and a pair of non-rotative insulated collector rings located in coaxial relation with said rotatable member, said forked contact member straddling said pair of collector rings and effective to engage said rings in bridging relation only while said inertia ring is displaced at least a predetermined amount in either direction out of its normal position with respect to said rotatable member.

GEORGE K. NEWELL.